UNITED STATES PATENT OFFICE.

CHAUNCEY C. LOOMIS, OF NEW YORK, N. Y., ASSIGNOR TO SEMET-SOLVAY COMPANY, OF SOLVAY, NEW YORK, A CORPORATION OF NEW YORK.

PROCESS OF PRODUCING SALICYL ALDEHYDE.

1,427,400. Specification of Letters Patent. Patented Aug. 29, 1922.

No Drawing. Application filed June 23, 1921. Serial No. 479,811.

*To all whom it may concern:*

Be it known that I, CHAUNCEY C. LOOMIS, a citizen of the United States, residing in the city of New York, in the county and State of New York, have invented certain new and useful Improvements in Processes of Producing Salicyl Aldehyde, of which the following is a specification.

It has heretofore been known, that salicyl aldehyde will be formed in the reactions incident to the addition of sodium amalgam to a water solution of sodium salicylate and boric acid. The commercial utilization of this has, however, been prevented by the fact that the aldehyde decomposes as formed.

I have found, however, and my invention is based upon the discovery that if compounds such as sodium sulfite or bisulfite, or potassium sulfite or bisulfite, which are alkali metal sulfites and bisulfites be added to the reaction mixture in excess of the quantity required to form an addition product with the salicyl aldehyde as formed, the decomposition of the aldehyde will be decreased and it can be recovered without material loss by steam distillation of the addition product after the completion of the reaction. It is desirable to observe certain details of operation in order to secure the best quantitative results and the invention will be best understood by the following example.

Ten parts of salicylic acid, eight parts of borax and ten parts of boric acid are dissolved by warming with 30 parts of water. The solution of acid sodium boro disalicylate formed is then cooled to about 15° C. and twenty parts of sodium bisulfite are added with vigorous stirring. The reaction mixture is kept cool in a water bath and vigorous stirring is continued. Fifty parts of 10 per cent sodium amalgam are now added slowly, the temperature being kept at approximately 15° C. When the mixture has been stirred at this temperature for about one-half hour the mercury is separated from the solution and the latter is distilled down until inorganic salts begin to crystallize out. About 200 parts of water should then be added and the distillation repeated as the last traces of aldehyde leave the sulfite solution very slowly. In some cases it is even desirable to repeat this a third time. The total distillate containing the aldehyde and a large volume of water is now redistilled until no more oil comes over. At this point the aldehyde comes over quite readily as no sulfite is present. The oil and water are then separated.

What I claim as new and desire to secure by Letters Patent is:—

1. The process of producing salicyl aldehyde which consists in forming the aldehyde in the presence of an alkali-metal sulfite or bisulfite in such excess as to convert the aldehyde as formed into a sulfite or bisulfite addition product and after the completion of the reaction distilling off the aldehyde from the addition product.

2. The improvement in the process of producing salicyl aldehyde which consists in converting the aldehyde as formed into a sulfite or bisulfite addition product and distilling off the aldehyde from the addition product.

3. The process of producing salicyl aldehyde which consists in forming an acid sodium boro disalicylate and treating the same with sodium amalgam in the presence of sodium sulfite or bisulfite.

In testimony whereof I affix my signature, this 22d day of June, 1921.

CHAUNCEY C. LOOMIS.